(12) United States Patent
Seto et al.

(10) Patent No.: US 10,424,187 B2
(45) Date of Patent: Sep. 24, 2019

(54) EMERGENCY NOTIFICATION DEVICE AND EMERGENCY NOTIFICATION SYSTEM

(71) Applicant: MAZDA MOTOR CORPORATION, Hiroshima (JP)

(72) Inventors: Takayuki Seto, Hiroshima (JP); Hiroaki Tanimoto, Hiroshima (JP); Pingyu Lin, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 16/086,540

(22) PCT Filed: Mar. 22, 2017

(86) PCT No.: PCT/JP2017/011390
§ 371 (c)(1),
(2) Date: Sep. 19, 2018

(87) PCT Pub. No.: WO2017/183376
PCT Pub. Date: Oct. 26, 2017

(65) Prior Publication Data
US 2019/0103010 A1    Apr. 4, 2019

(30) Foreign Application Priority Data
Apr. 19, 2016  (JP) ................... 2016-083653

(51) Int. Cl.
*H04M 11/04* (2006.01)
*G08B 25/01* (2006.01)
(Continued)

(52) U.S. Cl.
CPC ............ *G08B 25/016* (2013.01); *B60R 11/02* (2013.01); *G08B 25/004* (2013.01);
(Continued)

(58) Field of Classification Search
CPC ............... H04M 1/6075; H04M 11/04; H04M 1/72536; H04M 1/7253; G08B 25/00;
(Continued)

(56) References Cited

U.S. PATENT DOCUMENTS

| | | | | |
|---|---|---|---|---|
| 6,954,135 | B1 * | 10/2005 | Yoshioka | ................ B60R 25/04 340/426.2 |
| 7,200,409 | B1 * | 4/2007 | Ichikawa | ............. G08B 25/016 455/426.1 |

(Continued)

FOREIGN PATENT DOCUMENTS

| | | |
|---|---|---|
| EP | 1 143 400 A1 | 10/2001 |
| EP | 3273671 A1 * | 1/2018 ............. G08G 1/205 |

(Continued)

OTHER PUBLICATIONS

International Preliminary Report on Patentability and Written Opinion issued in PCT/JP2017/011390; dated Oct. 23, 2018.
(Continued)

*Primary Examiner* — Mahendra R Patel
(74) *Attorney, Agent, or Firm* — Studebaker & Brackett PC

(57) ABSTRACT

An emergency notification device (10) for notifying an emergency notification center (2) of emergency information b from the vehicle (1) in case of vehicle emergency, comprising: a wireless communication part (15) for performing wireless communication with the emergency notification center (2); a control part (11) for controlling the wireless communication part (15) to perform wireless communication with the emergency notification center (2) in case of vehicle emergency; and an in-vehicle communication part (12, 17) for performing communication with a communication terminal (40) in the vehicle; wherein the control part (11) is configured to, in a wireless communication disabled state in case of vehicle emergency, communicate with the
(Continued)

communication terminal (40) in the vehicle via the in-vehicle communication part to cause the communication terminal (40) to transmit the emergency information b to a predetermined emergency contact destination.

7 Claims, 10 Drawing Sheets

(51) Int. Cl.
| | |
|---|---|
| *B60R 11/02* | (2006.01) |
| *G08B 25/08* | (2006.01) |
| *G08B 25/10* | (2006.01) |
| *G08B 25/00* | (2006.01) |
| *H04M 1/725* | (2006.01) |
| *H04W 4/90* | (2018.01) |
| *H04W 76/50* | (2018.01) |
| *H04W 4/40* | (2018.01) |
| *H04M 1/60* | (2006.01) |

(52) U.S. Cl.
CPC ........... *G08B 25/009* (2013.01); *G08B 25/08* (2013.01); *G08B 25/10* (2013.01); *H04M 1/7253* (2013.01); *H04M 1/72536* (2013.01); *H04M 11/04* (2013.01); *H04W 4/40* (2018.02); *H04W 4/90* (2018.02); *H04W 76/50* (2018.02); *H04M 1/6075* (2013.01)

(58) Field of Classification Search
CPC ...... G08B 25/08; G08B 25/10; G08B 25/009; G08B 25/004; G08B 25/016; G08B 25/01; H04W 4/40; H04W 4/90; H04W 76/50; B60R 11/02
USPC ..... 455/404.1, 404.2, 456.1; 340/5.72, 425.5
See application file for complete search history.

(56) References Cited

U.S. PATENT DOCUMENTS

| | | | | |
|---|---|---|---|---|
| 8,903,351 | B2* | 12/2014 | Berry | H04M 1/6091 |
| | | | | 455/404.1 |
| 8,903,354 | B2* | 12/2014 | Hatton | G08G 1/205 |
| | | | | 455/404.2 |
| 8,977,324 | B2* | 3/2015 | Hatton | H04W 4/046 |
| | | | | 455/569.2 |
| 9,049,584 | B2* | 6/2015 | Hatton | H04W 4/90 |
| 2011/0210835 | A1* | 9/2011 | Kondo | G08G 1/205 |
| | | | | 340/425.5 |

FOREIGN PATENT DOCUMENTS

| | | | | | |
|---|---|---|---|---|---|
| JP | 2003-022490 | A | | 1/2003 | |
| JP | 2009-290789 | A | | 12/2009 | |
| JP | 2011-204232 | A | | 10/2011 | |
| JP | 2011204232 | A | * | 10/2011 | ............. G08G 1/205 |
| JP | 2011-232872 | A | | 11/2011 | |
| JP | 2015-126442 | A | | 7/2015 | |
| JP | 2015-158733 | A | | 9/2015 | |
| KR | 20150102049 | A | * | 9/2015 | ........... G08B 25/009 |
| WO | WO-2017051731 | A1 | * | 3/2017 | ............. G01C 21/26 |

OTHER PUBLICATIONS

International Search Report issued in PCT/JP2017/011390; dated Jun. 6, 2017.
Office Action corresponding to Japanese Patent Application No. 2016-083653; mailed by the Japanese Patent Office dated May 7, 2018.
The extended European search report issued by the European Patent Office dated Feb. 5, 2019, which corresponds to EP17785718.2-1206 and is related to U.S. Appl. No. 16/086,540.

* cited by examiner

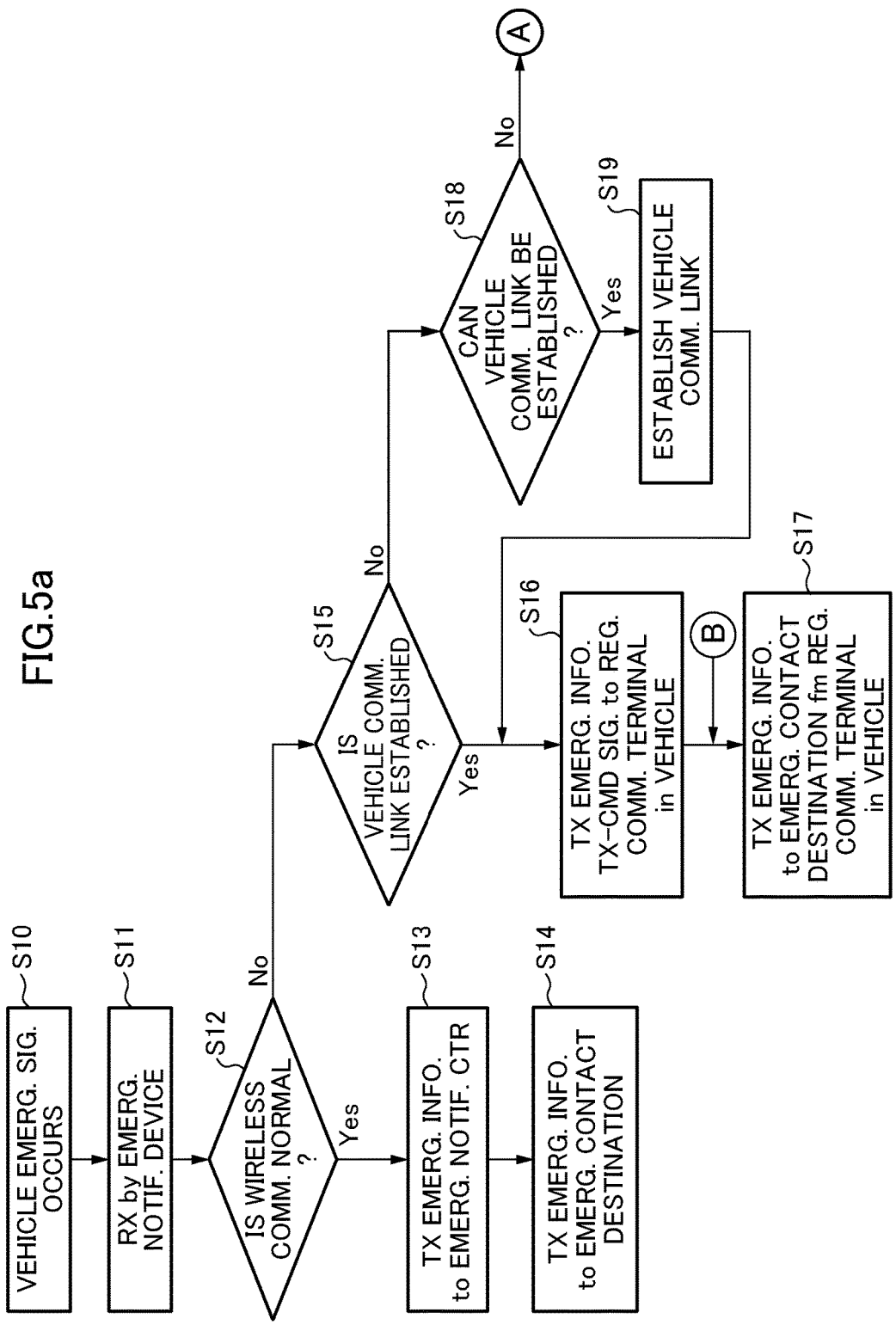

FIG.7
(A) VEHICLE BATT
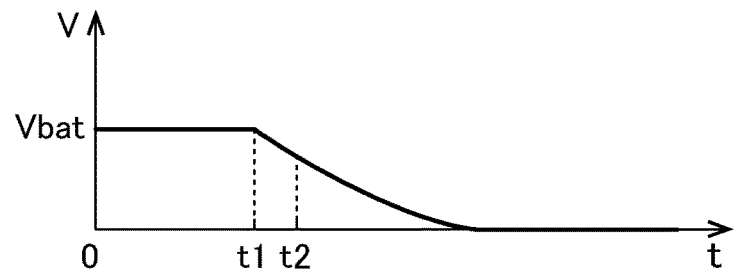
(B) AIR BAG ECU
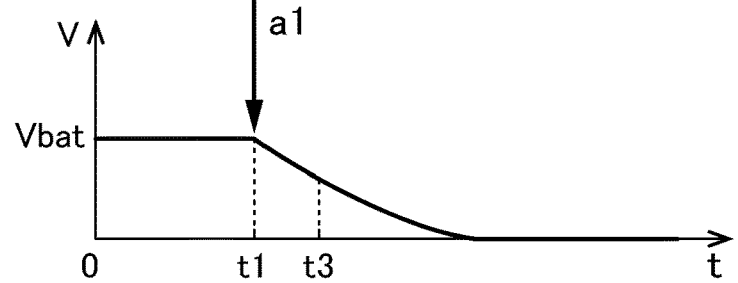
(C) EMERG. NOTIF. DEVICE
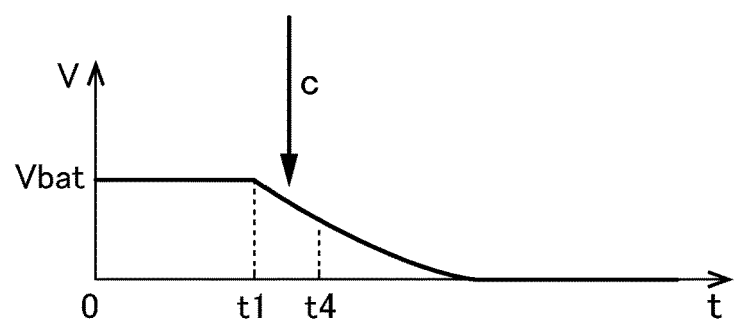
(D) AUDIO CONT. DEVICE
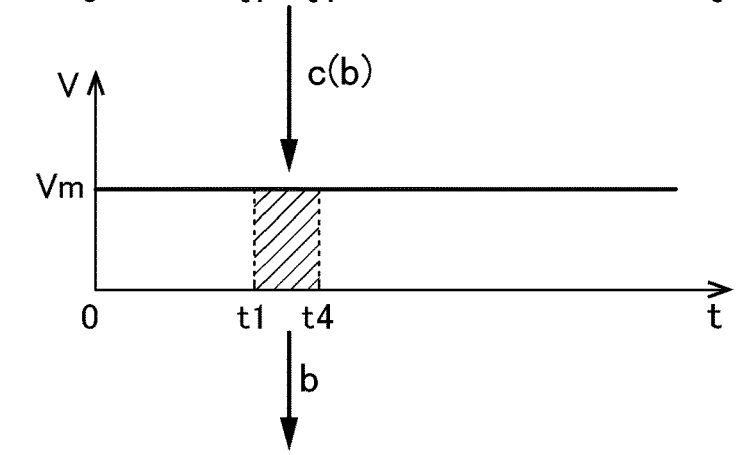
(E) MOBILE TERMINAL in VEHICLE

EMERGENCY NOTIFICATION DEVICE AND EMERGENCY NOTIFICATION SYSTEM

TECHNICAL FIELD

The present invention relates to an emergency notification device and an emergency notification system, and more particularly to an emergency notification device and an emergency notification system for, in case of vehicle emergency of a vehicle, notifying an emergency notification center outside the vehicle of emergency information from the vehicle.

BACKGROUND ART

Conventionally, emergency notification devices for, in case of emergency such as a vehicle collision and a driver's bad physical condition, notifying a predetermined emergency notification center of emergency information from the vehicle have been known (for example, see Patent Document 1). In such an emergency notification device, a communication line with the emergency notification center is established in case of emergency to communicate current position information and the like to the emergency notification center to enable telephone conversation between the driver and an operator of the emergency notification center.

CITATION LIST

Patent Document

Patent Document 1: Japanese Patent Laid-Open No. 2009-290789

SUMMARY OF INVENTION

Technical Problem

There is, however, a problem that, when breakage or malfunction of an antenna or a communication circuit of the emergency notification device occurs due to the vehicle collision or the like, communication with the emergency notification center is disabled.

The present invention has been made to solve such a problem, and an object is to provide an emergency notification device and an emergency notification system making it possible to, even if communication with the emergency notification center is disabled by breakage or malfunction of the emergency communication device, communicate the vehicle emergency state to the outside.

Solution to Problem

In order to achieve the above object, the present invention is an emergency notification device for notifying an emergency notification center outside a vehicle of emergency information from the vehicle in case of vehicle emergency, the emergency notification device comprising: a wireless communication part for performing wireless communication with the emergency notification center; a control part controlling the wireless communication part to perform wireless communication with the emergency notification center in case of vehicle emergency; and an in-vehicle communication part for performing communication with a communication terminal in the vehicle; wherein the control part is configured to, in a wireless communication disabled state in which the wireless communication with the emergency notification center via the wireless communication part is disabled in case of vehicle emergency, communicate with the communication terminal existing in the vehicle via the in-vehicle communication part to cause the communication terminal to transmit the emergency information to a predetermined emergency contact destination.

According to the present invention configured as described above, even if it is not possible to notify the emergency notification center of emergency information via the wireless communication part of the emergency notification device in case of vehicle emergency, it is possible for the emergency notification device to, by communicating with a communication terminal in the vehicle via the in-vehicle communication part, to cause emergency information to be transmitted to an emergency contact destination outside from the communication terminal. Thereby, in the present invention, even if communication between the emergency notification device and the emergency notification center is impossible, it is possible to, by notifying the predetermined emergency contact destination of the emergency information, quickly respond to the vehicle emergency state through help of the emergency contact destination.

Further, in the present invention, preferably, the communication terminal is at least one of a mobile terminal portable by a driver and a communication device mounted on the vehicle and capable of wireless communication; and, in the wireless communication disabled state, the control part is configured to transmit an emergency information transmission command signal to the communication terminal via the in-vehicle communication part in order to cause the communication terminal to execute transmission of the emergency information to the emergency contact destination.

According to the present invention configured as described above, even if the emergency notification device itself cannot communicate emergency information because of a wireless communication disabled state, the emergency information can be communicated to the outside from at least one of a mobile terminal carried by the driver and a communication device mounted on the vehicle, and, therefore, it is possible to significantly improve the possibility of execution of emergency notification in case of vehicle emergency.

Further, in the present invention, preferably, the emergency notification device further comprises a storage part storing device information identifying one or more communication terminals as registered communication terminals; and the control part is configured to: acquire device information about an in-vehicle communication terminal that is the communication terminal existing in the vehicle, via the in-vehicle communication part; judge whether or not the in-vehicle communication terminal that the control part has communicated with is any of the registered communication terminals, based on the device information stored in the storage part; and cause the in-vehicle communication terminal to transmit the emergency information, if the in-vehicle communication terminal that the control part has communicated with is any of the registered communication terminals.

According to the present invention configured as described above, when the emergency notification device is in a state of communicating with a registered communication terminal registered with the storage part via the in-vehicle communication part, it is possible to transmit emergency information to the outside via the registered communication terminal.

Further, in the present invention, preferably, the storage part stores a communication address of the emergency contact destination.

According to the present invention configured as described above, by the driver registering a desired emergency contact destination with the storage part, it is possible to efficiently respond to a vehicle emergency state in case of vehicle emergency.

Further, in the present invention, preferably, in the wireless communication disabled state, the control part is configured to: judge whether or not the control part is in a state of communicating with any of the registered communication terminals via the in-vehicle communication part; and cause the registered communication terminal to transmit the emergency information, if any of the registered communication terminals is in the communication state.

According to the present invention configured as described above, if a registered communication terminal that is in a state of communicating via the in-vehicle communication part exists in a wireless communication disabled state, it becomes possible to cause emergency information to be immediately transmitted from the registered communication terminal.

Further, in the present invention, preferably, in the wireless communication disabled state, the control part is configured to: judge whether or not the control part is in a state of communicating with any of the registered communication terminals via the in-vehicle communication part; and, if none of the registered communication terminals is in the communication state, establish a vehicle communication link with any of the registered communication terminals via the in-vehicle communication part and cause the registered communication terminal to transmit the emergency information.

According to the present invention configured as described above, even if a registered communication terminal that is in a state of communicating via the in-vehicle communication part does not exist in a wireless communication disabled state, it is possible to, by newly establishing a vehicle communication link with a registered communication terminal, cause emergency information to be transmitted from the registered communication terminal.

Further, in order to achieve the above object, the present invention is an emergency notification system comprising: an emergency notification device for notifying an emergency notification center outside a vehicle of emergency information from the vehicle in case of vehicle emergency; and a communication terminal, wherein the emergency notification device comprises: a wireless communication part for performing wireless communication with the emergency notification center; a control part controlling the wireless communication part to perform wireless communication with the emergency notification center in case of vehicle emergency; and an in-vehicle communication part for performing communication with the communication terminal; and the control part is configured to, in a wireless communication disabled state in which the wireless communication with the emergency notification center via the wireless communication part is disabled in case of vehicle emergency, transmit an emergency information transmission command signal to the communication terminal via the in-vehicle communication part in order to cause the communication terminal to execute transmission of the emergency information to a predetermined emergency contact destination; and the communication terminal is configured to transmit the emergency information to the emergency contact destination in response to receiving the emergency information transmission command signal.

Advantageous Effect of Invention

According to an emergency notification device and an emergency notification system of the present invention, it is possible to, even if communication with an emergency communication center is disabled by breakage or malfunction of the emergency notification device, enable communication of the vehicle emergency state to the outside.

BRIEF DESCRIPTION OF DRAWINGS

FIG. 5a is a flowchart of a process in case of vehicle emergency in the emergency notification system of the first embodiment of the present invention.

FIG. 7 is an explanatory diagram of signal output timings among units at the time of vehicle battery voltage being cut off in case of vehicle emergency, in the emergency notification system of the first embodiment of the present invention.

DESCRIPTION OF EMBODIMENTS

Embodiments of the present invention will be described below with reference to accompanying drawings.

Figure 1:
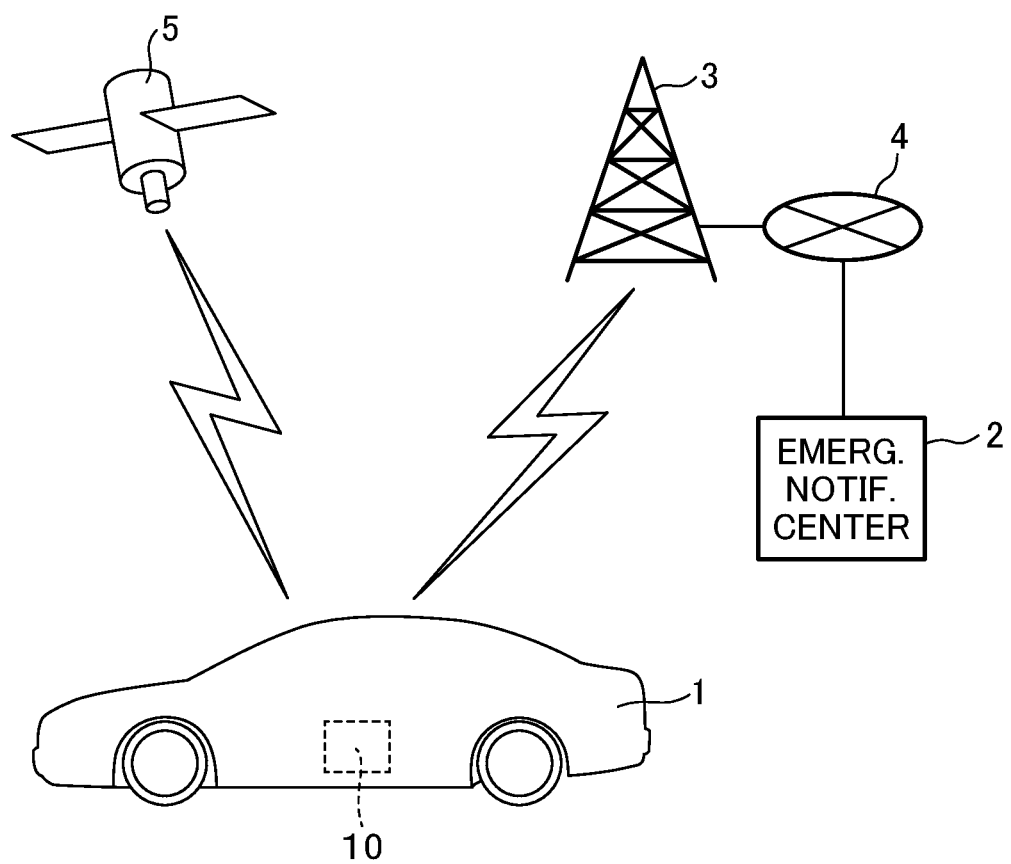
FIG. 1 is an explanatory diagram of an emergency notification system of a first embodiment of the present invention.
Figure 2:
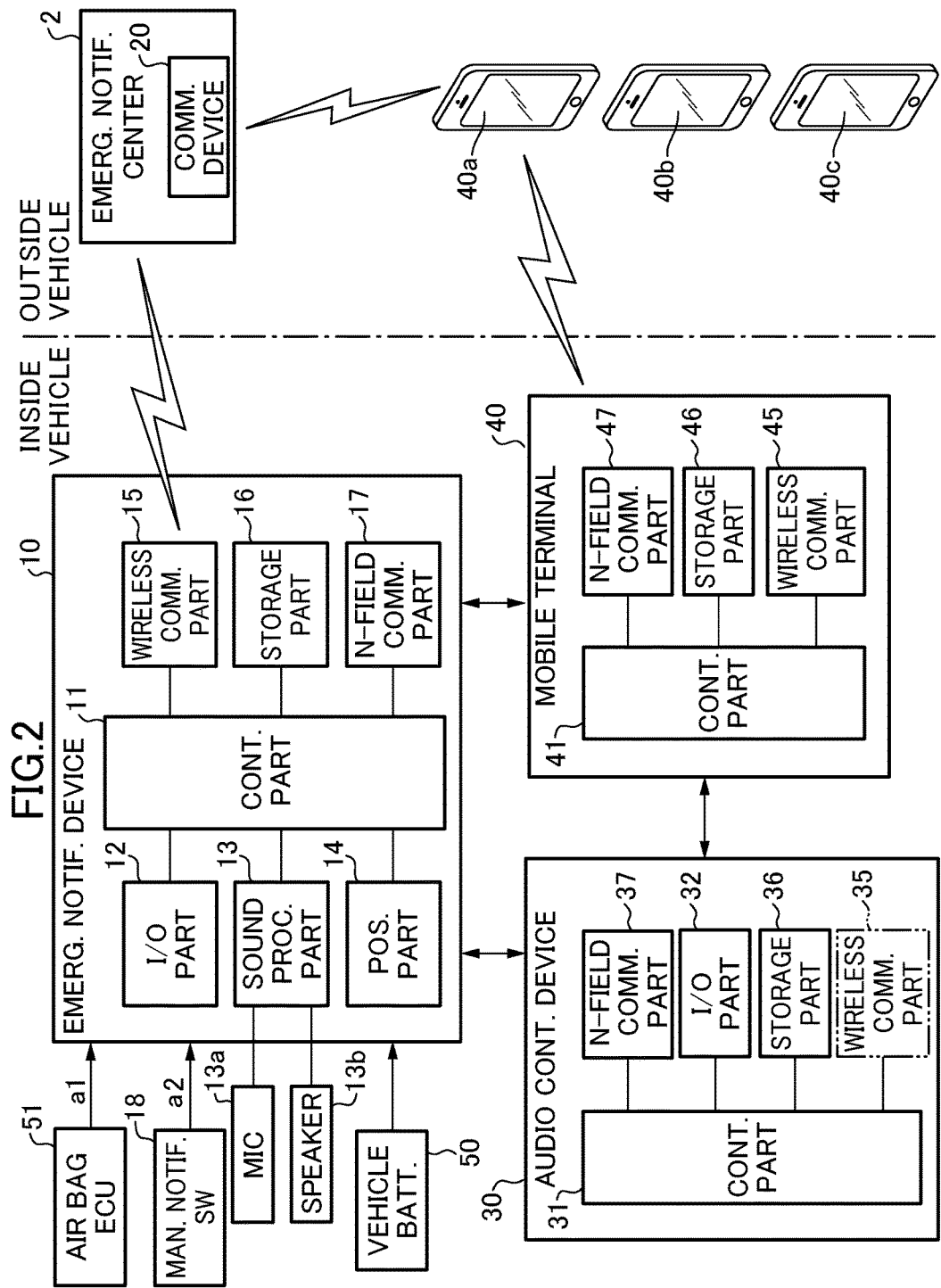
FIG. 2 is an explanatory diagram showing a configuration of an emergency notification device of the first embodiment of the present invention.
Figure 3:
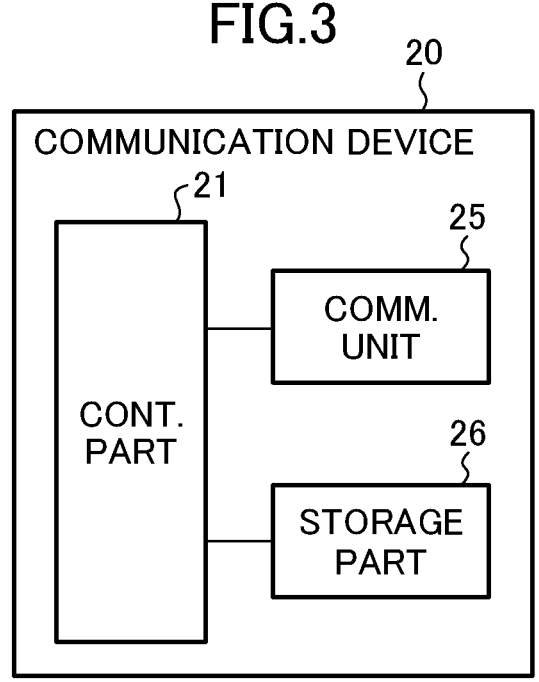
FIG. 3 is an explanatory diagram showing a configuration of a communication device of an emergency notification center of the first embodiment of the present invention.

First, an outline of an emergency notification system and an emergency notification device of a first embodiment of the present invention will be described with reference to FIGS. 1 to 3. FIG. 1 is an explanatory diagram of the emergency notification system; FIG. 2 is an explanatory diagram showing a configuration of the emergency notification device; and FIG. 3 is an explanatory diagram showing a configuration of a communication device of an emergency notification center.

As shown in FIG. 1, a vehicle 1 provided with an emergency notification device 10 is configured such that a communication line can be established with an emergency notification center 2 via a base station 3 and a communication network 4 in case of vehicle emergency (for example, a vehicle collision, sudden illness of a driver, or the like). The vehicle 1 acquires current position information about the vehicle 1 using a GPS satellite 5 and communicates the current position information, vehicle identification information and the like via an established communication line. The vehicle identification information is a serial number or the like for identifying each vehicle 1. Further, voice conversation between the driver and an operator of the emergency notification center 2 is enabled. Thereby, it is possible to quickly perform necessary actions such as arrangement of an ambulance via the emergency notification center 2.

As shown in FIG. 2, the emergency notification device 10 is provided with a control part 11, an I/O part 12, a sound processing part 13, a positioning part 14, a wireless communication part 15, a storage part 16, a near-field communication part 17 and a manual notification switch 18.

The control part 11 is configured, for example, with a CPU, etc. and executes an emergency notification process described below in response to receiving a vehicle emergency signal a1 or a2 (that is, in case of vehicle emergency).

The I/O part 12 is a communication interface for performing in-vehicle communication with other units (a control device and the like) of the vehicle 1 via an in-vehicle LAN.

The sound processing part 13 is connected to a microphone 13a and a speaker 13b arranged in the vehicle 1, and is configured to perform conversion processing between a voice signal and an electrical signal when the driver performs a telephone conversation with an operator of the emergency notification center 2.

The positioning part 14 receives a GPS signal from the GPS satellite 5 and acquires the current position information.

The wireless communication part 15 performs wireless communication (data communication and voice communication) with the emergency notification center 2 via the base station 3 and the communication network 4.

The storage part 16 stores vehicle information for identifying the vehicle 1 (the vehicle identification information, a communication address of the emergency notification device 10 and the like) and device information about the emergency notification center 2 and a plurality of registered communication terminals (device identification information, communication destination names, communication addresses (telephone numbers, e-mail addresses and the like) and the like. The registered communication terminals are, for example, mobile terminals 40, 40a, 40b and 40c owned by family members sharing the vehicle 1.

The near-field communication part 17 performs, via a communication link established with the other communication devices of the vehicle 1 (hereinafter referred to as a "vehicle communication link"), communication with the other communication devices using near-field wireless communication or wired communication. The near-field wireless communication is communication using, for example, Bluetooth (registered trademark) or wireless LAN (such as Wi-Fi (registered trademark)). The wired communication is communication via a cable, for example.

The manual notification switch 18 is configured such that, when it becomes necessary to make a notification to the emergency notification center 2 because of the driver's sudden illness or the like, the vehicle emergency signal a2 can be outputted to the control part 11 by the driver operating the manual notification switch 18.

The emergency notification device 10 is connected to a vehicle battery 50 and is configured so that power is supplied by the vehicle battery 50. The I/O part 12 and the near-field communication part 17 correspond to an in-vehicle communication part for performing communication with the communication devices in the vehicle 1.

An air bag ECU 51 is provided with a vehicle collision detection sensor that detects a collision of the vehicle 1 using an acceleration sensor and the like not shown and is configured to, when detecting a vehicle collision, develop an air bag in a predetermined manner. At this time, the air bag ECU 51 transmits a collision detection signal, which is the vehicle emergency signal a1, via the in-vehicle LAN. The emergency notification device 10 can read the collision detection signal on the in-vehicle LAN as the vehicle emergency signal a1.

Though the vehicle emergency signal is generated in response to detection of a vehicle collision in the present embodiment, this is not limitative. The vehicle emergency signal may be generated in response to detection of a particular vehicle failure, detection of the driver's bad physical condition by a monitor camera or the like.

An audio control device 30 is communicably connected to the emergency notification device 10 via the in-vehicle LAN. The audio control device 30 outputs a voice signal of a TV, a radio, a musical medium, a navigation system or the like to a speaker drive unit (not shown). The speaker drive unit causes voice to be outputted from an onboard speaker (not shown) by amplifying a received voice signal and driving the onboard speaker.

As shown in FIG. 2, the audio control device 30 is provided with a control part 31, an I/O part 32, a storage part 36 and a near-field communication part 37. The control part 31 acquires a voice signal from outside and causes the speaker drive unit to operate as described above. Further, the control part 31 executes a process to be described later when the emergency notification device 10 executes the emergency notification process.

The I/O part 32 is a communication interface for performing in-vehicle communication with the other units (the control device and the like) including the emergency notification device 10 via the in-vehicle LAN.

The storage part 36 stores various pieces of voice-related information and the like.

The near-field communication part 37 performs communication with other communication devices using the near-field wireless communication and the wired communication described above.

As shown in FIG. 2, the mobile terminal 40 is, for example, the driver's mobile phone or smartphone and is brought in the vehicle 1. The mobile terminal 40 is provided with a control part 41, a wireless communication part 45, a storage part 46 and a near-field communication part 47.

The control part 41 performs a communication process as a mobile phone and an internal application execution process and the like.

The wireless communication part 45 performs wireless communication (data communication and voice communication) with other communication devices (the mobile terminals 40a, 40b and 40c and the like) via the base station 3 and the communication network 4.

The storage part 46 stores various applications and music information.

The near-field communication part 47 performs communication with the emergency notification device 10 and the audio control device 30, which are communication devices, via the near-field wireless communication and the wired communication described above.

As shown in FIG. 3, a communication device 20 configured with a server computer or the like is arranged in the emergency notification center 2, and the communication device 20 is provided with a control part 21 having a processor, a communication unit 25 that performs communication with the outside via the communication network 4, a storage part 26 that stores various programs and data, input/output devices, display device and the like (not shown).

In the storage part 26, vehicle information (vehicle identification information, a communication address of the emergency notification device 10 and the like) about each vehicle 1, and device information (including communication addresses and the like) about one or more communication terminals registered in association with the vehicle identification information about each vehicle 1 are stored. In the present embodiment the mobile terminals 40, 40a, 40b and 40c are registered in association with the vehicle identification information about the vehicle 1.

Figure 4:
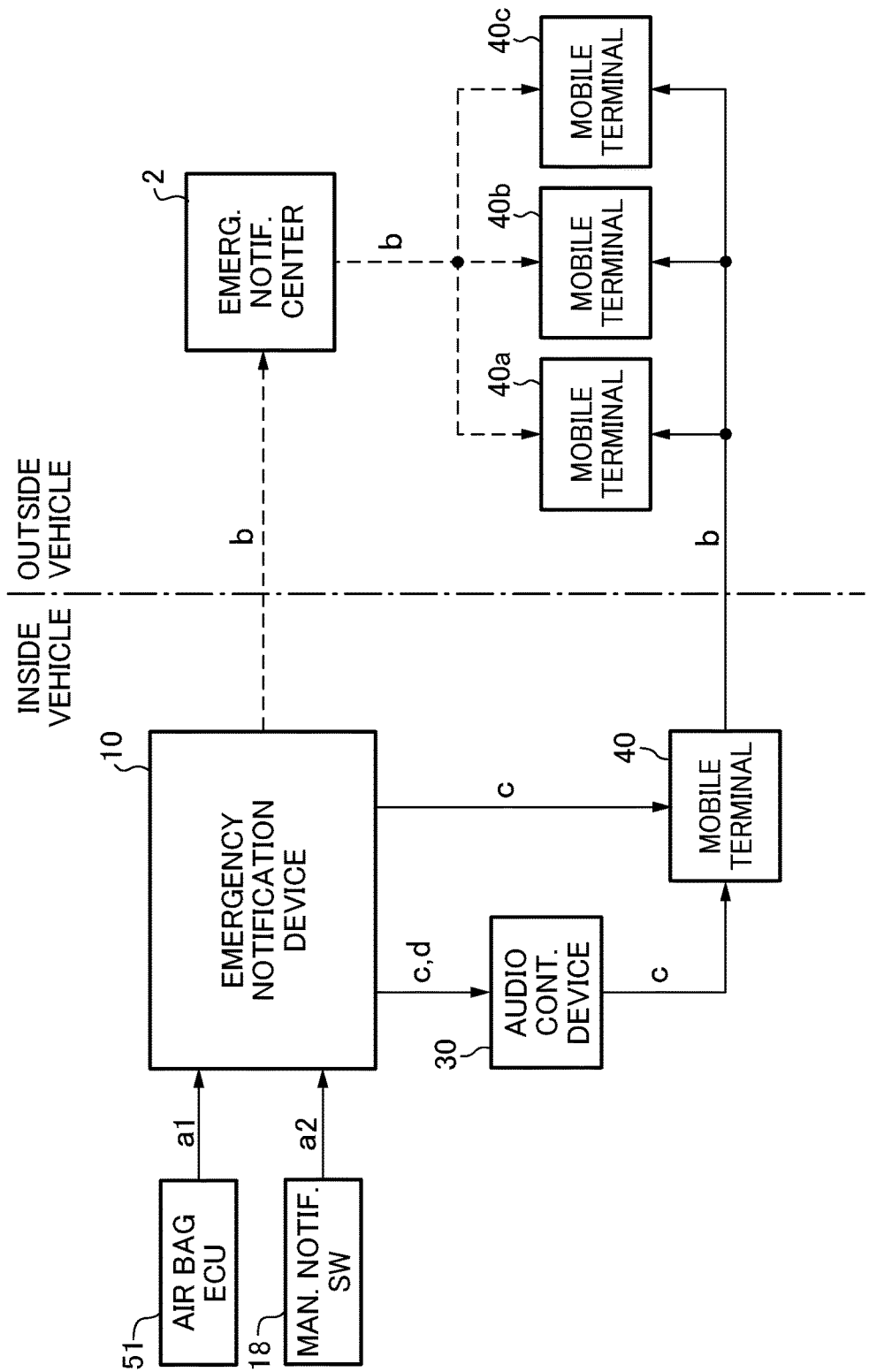
FIG. 4 is an explanatory diagram of a process in the emergency notification system of the first embodiment of the present invention.
Figure 5B:
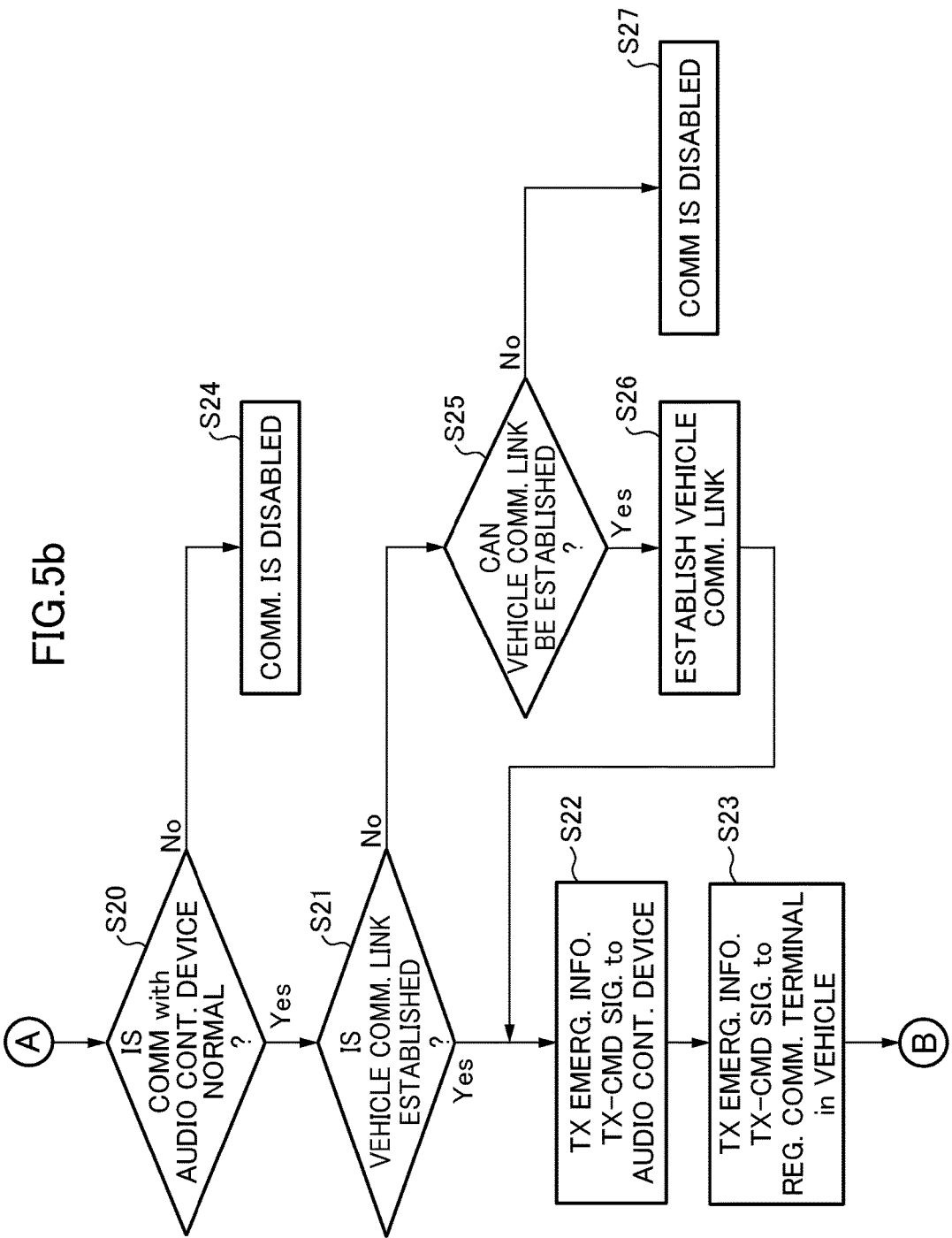
FIG. 5b is a flowchart of the process in case of vehicle emergency in the emergency notification system of the first embodiment of the present invention.

Next, operation of the emergency notification system of the present embodiment will be described with reference to FIGS. 4, 5a and 5b. FIG. 4 is an explanatory diagram of a process in the emergency notification system, and FIGS. 5a and 5b are flowcharts of a process in case of vehicle emergency in the emergency notification system.

In a situation shown in FIG. 4, a communication link by near-field wireless communication or wired communication can be established between the driver's mobile terminal 40, and the audio control device 30 and the emergency notification device 10. The control part 41 of the mobile terminal 40 is transmitting music information stored in the storage part 46 to the audio control device 30 via the near-field communication part 47. The control part 31 of the audio control device 30 outputs the music information received via the near-field communication part 37 to the speaker drive unit and causes the music information to be outputted from the onboard speaker as a voice output.

When, in this situation, the vehicle emergency signal a1 (a collision detection signal) is outputted from the air bag ECU 51, or the vehicle emergency signal a2 is outputted from the manual notification switch 18 by a driver's operation (step S10 in FIG. 5a), the emergency notification device 10 receives the vehicle emergency signal a1 or the vehicle emergency signal a2 (step S11). Various processes for vehicle emergency are executed in response to reception of the signal.

When receiving the vehicle emergency signal a1 or a2, the emergency notification device 10 executes the emergency notification process. First, in the emergency notification device 10, the control part 11 judges whether or not wireless communication with the emergency notification center 2 is normally possible for a predetermined period or more via a wireless communication link (step S12). Specifically, the control part 11 judges that wireless communication is normally possible if each of voltage of the vehicle battery 50 itself and voltage of a power supply line to the emergency notification device 10 is equal to or above a predetermined threshold voltage, and a wireless communication function of the wireless communication part 15 (including a communication antenna) of the emergency notification device 10 is in a normal state.

If wireless communication is normally possible (step S12: Yes), the control part 11 of the emergency notification device 10 controls the wireless communication part 15 to establish a wireless communication link with the communication device 20 of the emergency notification center 2 and transmits emergency information b to the emergency notification center 2 using the communication address of the emergency notification center 2 stored in the storage part 16 (step S13). This emergency information b includes information about the vehicle emergency (identifying one of a vehicle collision and an operation of the manual notification switch 18), current position information, vehicle identification information and the like. Then, between the emergency notification device 10 and the emergency notification center 2, voice conversation through a wireless communication link is enabled.

In the communication device 20 of the emergency notification center 2, when receiving the emergency information b via the communication unit 25, the control part 21 performs a process for transferring the emergency information b to emergency contact destinations (step S14). In this transfer process, the emergency information b may be transmitted by data communication such as e-mail or may be transmitted by voice communication using an automatic voice synthesis function.

In the communication device 20 of the emergency notification center 2, the control part 21 refers to registered correspondence relationships between the vehicle identification information and the device information about communication terminals, which are stored in the storage part 26, to identify the emergency contact destinations. That is, the control part 21 identifies the mobile terminals 40, 40a, 40b and 40c registered in association with the vehicle identification information included in the emergency information b received from the emergency notification device 10 as the emergency contact destinations. Then, the communication device 20 transmits the emergency information b to these communication terminals. By receiving the emergency information b, the mobile terminals 40, 40a, 40b and 40c can identify the vehicle 1 being in the vehicle emergency state from the vehicle identification information included in the emergency information b.

However, when cutoff of power supply from the vehicle battery 50 (due to breakage of the vehicle battery 50 itself, disconnection of a power supply line or the like), breakage of the emergency notification device 10 (due to breakage of the communication antenna or the wireless communication part 15, or the like) or the like occurs because of a vehicle collision, there may occur a case where it is not possible to normally perform wireless communication between the emergency notification device 10 and the emergency notification center 2. In the present embodiment, a configuration is made in which, in such a wireless communication disabled state, the emergency information b is notified to the outside via another communication device. Specifically, as described below, the emergency notification device 10 controls the mobile terminal 40 in the vehicle 1 to cause the emergency information b to be notified to predetermined emergency contact destinations from the mobile terminal 40.

That is, in the case of a wireless communication disabled state in which it is not possible to normally perform wireless communication (step S12: No), the emergency notification device 10 judges whether or not a vehicle communication link is established with a registered communication terminal at that point of time (step S15). Specifically, the control part 11 judges whether a communication link is established with any of the plurality of registered communication terminals stored in the storage part 16 (in FIG. 4, the mobile terminal 40). Therefore, the control part 11 acquires device information (device identification information) about the communicating communication terminal via a vehicle communication link and, if the acquired device information corresponds to one of the pieces of device information about the registered communication terminals stored in the storage part 16, judges that the communicating communication terminals is a registered communication terminal.

As shown in FIG. 4, if a vehicle communication link is established between the emergency notification device 10 and a registered communication terminal (the mobile terminal 40) (step S15: Yes), the emergency notification device 10 transmits an emergency information transmission command signal c to the mobile terminal 40 (step S16). The emergency information transmission command signal c is a signal for causing the emergency information b described above to be transmitted from the registered communication terminal (the mobile terminal 40) to the other registered communication terminals (the mobile terminals 40a, 40b and 40c) and includes the emergency information b and the communication addresses of the registered communication terminals that are emergency contact destinations (except for the mobile terminal 40).

The mobile terminal 40 is programmed to execute an emergency information transmission process in response to the received emergency information transmission command signal c. In this emergency information transmission process, the mobile terminal 40 transmits emergency information b to the mobile terminals 40a, 40b and 40c, which are the emergency contact destinations included in the emergency information transmission command signal c (step S17). The transmission may be also data communication such as e-mail or may be voice communication using the automatic voice synthesis function. By receiving the emergency information b, the mobile terminals 40a, 40b and 40c can identify the vehicle 1 and the driver in the vehicle emergency state from the vehicle identification information included in the emergency information b and the transmission source of the communication (the mobile terminal 40).

The emergency information transmission command signal c may not include the communication addresses of the emergency contact destinations. In this case, the mobile terminal 40 may be configured to store the communication addresses of the emergency contact destinations in advance and, in response to receiving the emergency information transmission command signal c, transmit the emergency information b to the communication addresses of the emergency contact destinations stored in advance.

On the other hand, if a vehicle communication link is not established between the emergency notification device 10 and a registered communication terminal (step S15: No), the emergency notification device 10 judges whether or not a vehicle communication link can be established with a registered communication terminal (step S18). For example, the emergency notification device 10 transmits an inquiry signal to surrounding communication devices based on predetermined communication specifications and, if authenticating that a response thereto (including device information) is from a registered communication terminal, judges that communication is possible. If a vehicle communication link can be established between the emergency notification device 10 and a registered communication terminal (step S18: Yes), the emergency notification device 10 establishes a vehicle communication link with a connectable registered communication terminal existing in the vehicle 1 (for example, the mobile terminal 40) (step S19) and then executes processes of steps S16 and S17.

If a vehicle communication link cannot be established between the emergency notification device 10 and a registered communication terminal, for example, for reasons such as malfunction of the near-field communication part 17 of the emergency notification device 10 (step S18: No), the emergency notification device 10 judges whether communication between the emergency notification device 10 and the audio control device 30 via the in-vehicle LAN is normal or not (step S20 in FIG. 5b). For example, if the in-vehicle LAN line is not disconnected, and, as a result, some communication data can be received by the I/O part 12 via the in-vehicle LAN, the emergency notification device 10 judges that the in-vehicle LAN communication is normal.

In this case, as described below with reference to FIG. 7, since the emergency notification device 10 and the audio control device 30 can perform in-vehicle LAN communication in a predetermined short period even if power supply from the vehicle battery 50 is cut off due to a vehicle collision, the emergency notification device 10 does not judge voltage of the vehicle battery 50 and the like.

A configuration may be made in which, when transmitting a signal for confirming connection to the audio control device 30 via the in-vehicle LAN and then receiving a response to the signal from the audio control device 30, the emergency notification device 10 judges that the in-vehicle LAN communication is normal at step S20.

If the in-vehicle LAN communication between the emergency notification device 10 and the audio control device 30 is not normal (step S20: No), emergency notification from the vehicle 1 to the emergency notification center 2 and the registered communication terminals including the mobile terminals 40a, 40b and 40c outside the vehicle 1 is disabled (step S24).

On the other hand, if the in-vehicle LAN communication between the emergency notification device 10 and the audio control device 30 is normal (step S20: Yes), the emergency notification device 10 further judges whether a vehicle communication link is established between the audio control device 30 and a registered communication terminal (step S21). For example, the emergency notification device 10 inquires of the audio control device 30 about whether there is a communication terminal for which a vehicle communication link is established with the audio control device 30 and, if a vehicle communication link is established, device information about the communication terminal. Then, the emergency notification device 10 compares the device information acquired from the audio control device 30 with the device information about the registered communication terminals registered with the storage part 16 and, if there is any corresponding pair, judges that a vehicle communication link is established between the audio control device 30 and the registered communication terminal.

If a vehicle communication link is established between the audio control device 30 and a registered communication terminal (for example, the mobile terminal 40) (step S21: Yes), the emergency notification device 10 transmits the emergency information transmission command signal c described above to the audio control device 30 (step S22). The audio control device 30 is configured to, when receiving the emergency information transmission command signal c, transfer the emergency information transmission command signal c to the registered communication terminal (the mobile terminal 40) with which the vehicle communication link is established (step S23). Receiving the emergency information transmission command signal c from the audio control device 30, the mobile terminal 40 executes a process of step S17.

In the first embodiment, the device information about the registered communication terminals (that is, information such as the communication addresses of the emergency contact destinations) may be stored in the storage part 36 of the audio control device 30 in addition to the storage part 16 of the emergency notification device 10. In this case, though it is not necessary to include the communication addresses of the emergency contact destinations in the emergency information transmission command signal c that the audio control device 30 receives from the emergency notification device 10, device information identifying the registered communication terminal with which a vehicle communication link is established (the mobile terminal 40) is included. Receiving the emergency information transmission command signal c, the audio control device 30 refers to the device information included in the received signal to identify the emergency contact destinations. That is, the audio control device 30 can identify communication addresses of registered communication terminals except for the registered communication terminal having the device information included in the received signal (the mobile terminal 40) among the registered communication terminals stored in the storage part 36, generate the emergency information transmission command signal c that includes the communication addresses, and transmit the signal to the mobile terminal 40.

If a vehicle communication link is not established between the audio control device 30 and a registered communication terminal (step S21: No), the emergency notification device 10 judges whether the audio control device 30 can establish a vehicle communication link with a registered communication terminal (step S25). The emergency notification device 10 inquires of the audio control device 30, for example, about device information about a communication terminal with which a vehicle communication link can be established and judges, based on the device information acquired from the audio control device 30, whether the communication terminal with which a vehicle communication link can be established is a registered terminal or not.

For example, if the audio control device 30 cannot establish a vehicle communication link with a registered communication terminal for reasons such as that the mobile terminal 40 does not exist in the vehicle 1 (step S25: No), emergency notification from the vehicle 1 to the emergency notification center 2 and the registered communication terminals outside the vehicle 1 including the mobile terminals 40a, 40b and 40c is disabled (step S27).

On the other hand, if the audio control device 30 can establish a vehicle communication link with a registered communication terminal (for example, the mobile terminal 40) (step S25: Yes), the emergency notification device 10 transmits a vehicle communication link establishment request signal d to the audio control device 30 to establish a vehicle communication link with the registered communication terminal. When receiving the vehicle communication link establishment request signal d, the audio control device 30 causes a vehicle communication link to be established with a registered communication terminal existing in the vehicle 1 (the mobile terminal 40) (step S26), and, then, processes of steps S22, S23 and S17 are executed.

Figure 6:
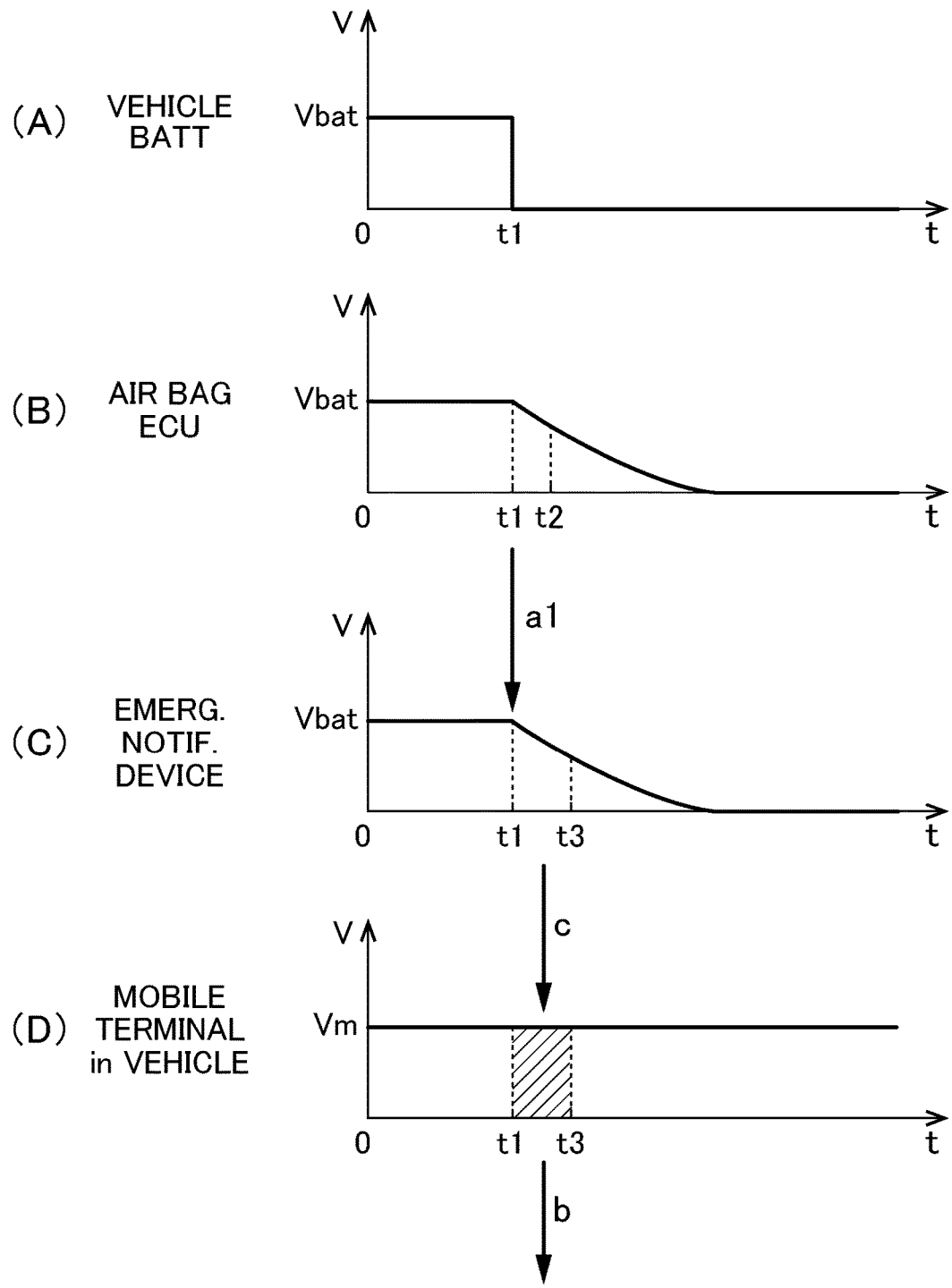
FIG. 6 is an explanatory diagram of signal output timings among units at the time of vehicle battery voltage being cut off in case of vehicle emergency, in the emergency notification system of the first embodiment of the present invention.

Next, signal output timings among units at the time of vehicle battery voltage being cut off in case of vehicle emergency will be described with reference to FIGS. 6 and 7. FIGS. 6 and 7 are explanatory diagrams of signal output timings among units at the time of vehicle battery voltage being cut off in case of vehicle emergency in the emergency notification system.

FIG. 6 shows, in a situation in which power supply from the vehicle battery 50 to the other units (the air bag ECU 51 and the emergency notification device 10) is cut off by a vehicle collision, supply voltage to each unit and a timing of outputting a signal from each unit. Here, it is assumed that the air bag ECU 51 and the emergency notification device 10 operate with DC voltage Vbat supplied from the vehicle battery 50, and the mobile terminal 40 operates with DC voltage Vm supplied from an internal battery.

It is assumed that the vehicle collision occurs at time t1, and the DC voltage Vbat supplied from the vehicle battery 50 drops to 0 V at the same time (see FIG. 6(A)). Therefore, at the time t1, voltage of the power supply lines to the air bag ECU 51 and the emergency notification device 10 drops to 0 V. However, the air bag ECU 51 and the emergency notification device 10 have internal capacitors, respectively, and can continue operation for a predetermined short time, receiving power supply from the internal capacitors even if supply voltage from the vehicle battery 50 does not come. That is, the air bag ECU 51 and the emergency notification device 10 can operate until time t2 and t3 at which supply voltages from the internal capacitors reach minimum operable voltages, respectively (see FIGS. 6(B) and 6(C)).

Therefore, the air bag ECU 51 can output the vehicle emergency signal a1 during a period after detection of the vehicle collision until the time t2 (step S10 in FIG. 5a). Then, the emergency notification device 10 can output the emergency information transmission command signal c to the mobile terminal 40 during a period after receiving the vehicle emergency signal a1 until the time t3 (see step S16 in FIG. 5a). Therefore, the mobile terminal 40 can receive the emergency information transmission command signal c during a period after the vehicle collision until the time t3 and transmit the emergency information b to the mobile terminals 40a, 40b and 40c that are the other registered communication terminals (see step S17 in FIG. 5a and FIG. 6(D)).

FIG. 7 is an explanatory diagram similar to FIG. 6 but shows a case where the audio control device 30 is added as a related unit. Here also, it is assumed that the audio control device 30 operates with the DC voltage Vbat supplied from the vehicle battery 50. The audio control device 30 also has an internal capacitor and can continue operation for a predetermined short time, receiving power supply from the internal capacitor even if supply voltage from the vehicle battery 50 does not come. That is, the audio control device 30 can operate until time t4 at which the supply voltage from the internal capacitor reaches minimum operable voltage (see FIG. 7(D)).

Since FIGS. 7(A) to 7(C) are similar to FIGS. 6(A) to 6(C), description will be omitted. In FIG. 7(C), however, the emergency notification device 10 outputs the emergency information transmission command signal c to the audio control device 30 during the period after the vehicle collision until the time t3 (see step S22 in FIG. 5b). Then, the audio control device 30 outputs the emergency information transmission command signal c to the mobile terminal 40 during a period after the vehicle collision until the time t4 (see step S23 in FIG. 5b). Therefore, the mobile terminal 40 receives the emergency information transmission command signal c during the period after the vehicle collision until the time t4 and transmits the emergency information b to the mobile terminals 40a, 40b and 40c that are the other registered communication terminals (see step S17 in FIG. 5a and FIG. 7(E)).

When the voltage of the vehicle battery 50 drops to 0 V due to the vehicle collision, voltage of the power supply line to each unit also drops to 0 V as shown in FIGS. 6 and 7. Therefore, at step S12 described above, the emergency notification device 10 does not judge that wireless communication is normally possible. Nevertheless, since each of the emergency notification device 10, the air bag ECU 51 and the audio control device 30 can operate for a predetermined short time, the processes in FIGS. 5*a* and 5*b* (furthermore in FIG. 9) can be executed.

Figure 8:
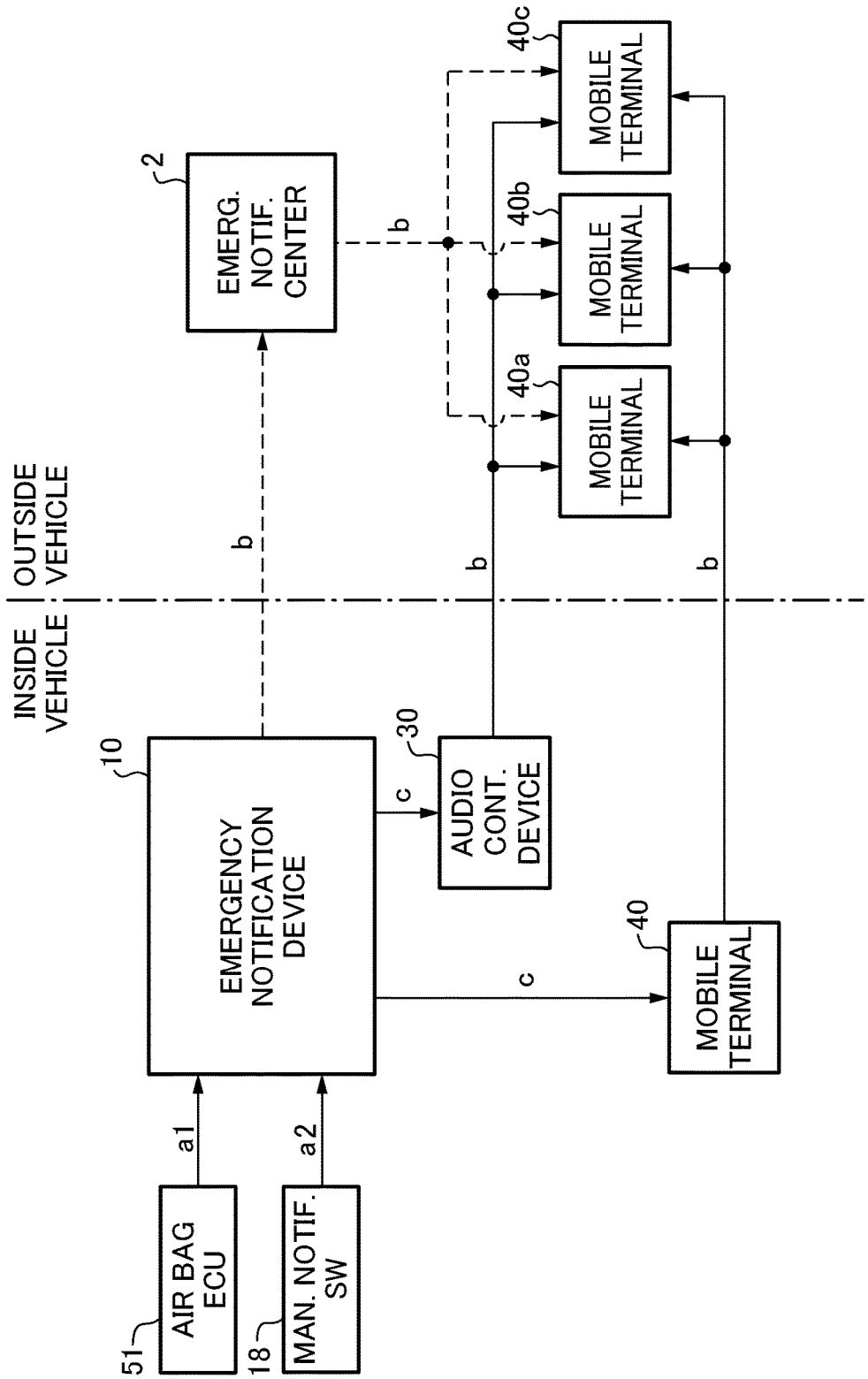
FIG. 8 is an explanatory diagram of a process in an emergency notification system of a second embodiment of the present invention.
Figure 9:
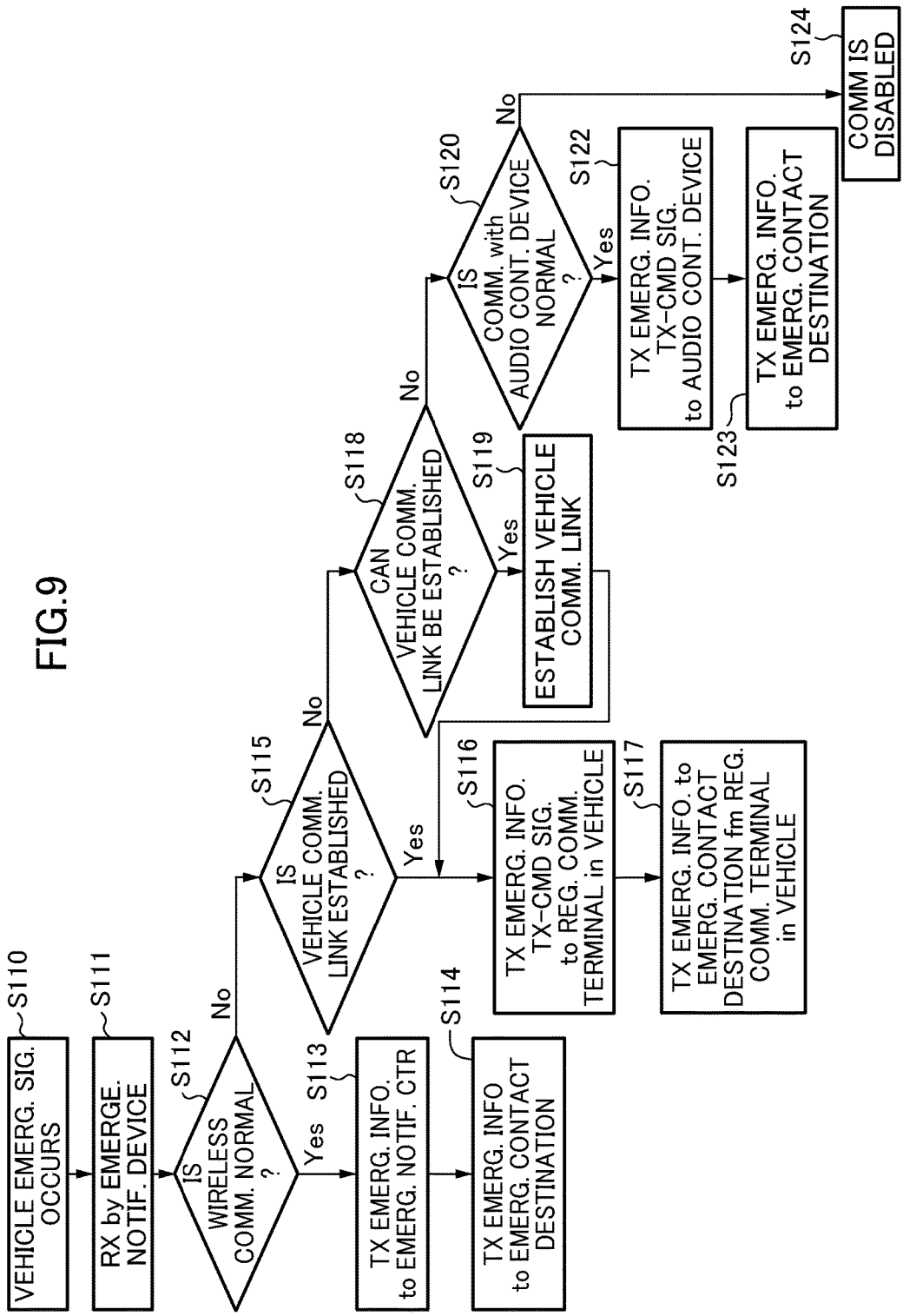
FIG. 9 is a flowchart of a process in case of vehicle emergency in the emergency notification system of the second embodiment of the present invention.

Next, a second embodiment of the present invention will be described with reference to FIGS. 8 and 9. FIG. 8 is an explanatory diagram of a process in the emergency notification system, and FIG. 9 is a flowchart of a process in case of vehicle emergency in the emergency notification system.

The second embodiment is different from the first embodiment in that the audio control device 30 is provided with a wireless communication part 35 (indicated by a broken line in FIG. 2) and functions as a communication device or a communication terminal. In the present embodiment, the audio control device 30 is configured to function as an onboard communication device, but this is not limitative. Another onboard device (for example, a navigation device) may be configured to function as an onboard communication device.

In the second embodiment, device information about the audio control device 30 as a registered communication terminal similar to the mobile terminal 40 and the like can be registered in the storage part 16 of the emergency notification device 10. Description will be made below mainly on parts different from the first embodiment, and duplicate explanation will be omitted.

In a situation shown in FIG. 8, a vehicle communication link by near-field wireless communication or wired communication can be established between the emergency notification device 10 and the mobile terminal 40 and between the audio control device 30 and the mobile terminal 40. Further, the emergency notification device 10 and the audio control device 30 can communicate via the in-vehicle LAN.

As for a flow of a process of each unit in case of vehicle emergency, steps S110 to S120, and S124 in FIG. 9 are the same as steps S10 to S20, and S24 in FIGS. 5*a* and 5*b*. If in-vehicle LAN communication between the emergency notification device 10 and the audio control device 30 is normal at step S120 (step S120: Yes), the emergency notification device 10 transmits an emergency information transmission command signal c to the audio control device 30 (step S122).

However, in this case, since a registered communication terminal that can establish a vehicle communication link with the emergency notification device 10 does not exist in the vehicle 1 (step S118: No), the emergency notification device 10 cannot identify emergency contact destinations. Therefore, in the second embodiment, the emergency information transmission command signal c transmitted from the emergency notification device 10 at step S122 can be configured so that the communication addresses of all the registered communication terminals (the mobile terminals 40, 40*a*, 40*b* and 40*c*) are included as communication addresses of emergency contact destinations.

In the second embodiment, the audio control device 30 is configured to, when receiving the emergency information transmission command signal c, execute the emergency information transmission process in response to the received emergency information transmission command signal c. Therefore, in this emergency information transmission process, the audio control device 30 transmits emergency information b to the emergency contact destinations included in the emergency information transmission command signal c (step S123). This transmission also may be data communication such as e-mail or may be voice communication using the automatic voice synthesis function.

In the second embodiment, the device information about the registered communication terminals may be stored in the storage part 36 of the audio control device 30. In this case, it is not necessary to include communication addresses of emergency contact destinations in the emergency information transmission command signal c that the audio control device 30 receives from the emergency notification device 10. Receiving the emergency information transmission command signal c in which communication addresses of emergency contact destinations are not included, the audio control device 30 can set the registered communication terminals stored in the storage part 36 as emergency contact destinations.

In the second embodiment, a timing of transmitting a signal from each unit at the time of the vehicle battery 50 being cut off is also as described with reference to FIGS. 6 and 7. In FIG. 7(D), however, when receiving the emergency information transmission command signal c from the emergency notification device 10, the audio control device 30 does not transfer the emergency information transmission command signal c to the mobile terminal 40 during a period until the time t4 but transmits the emergency information b to the mobile terminals 40*a*, 40*b* and 40*c*.

Next, operation of the emergency notification device of the present embodiment will be described.

In the present embodiment, even if it is not possible to notify the emergency notification center 2 of the emergency information b via the wireless communication part 15 of the emergency notification device 10 in case of vehicle emergency, it is possible for the emergency notification device 10 to, by communicating with the mobile terminal 40 in the vehicle 1 or the audio control device 30 via the near-field communication part 17 or the I/O part 12, transmit the emergency information b to the external emergency contact destinations (the mobile terminals 40*a*, 40*b* and 40*c*) from the mobile terminal 40 or the audio control device 30. Thereby, in the present embodiment, even if communication between the emergency notification device 10 and the emergency notification center 2 is disabled, it is possible to, by notifying predetermined emergency contact destinations of the emergency information b, quickly respond to a vehicle emergency state through help of the emergency contact destinations.

Further, in the present embodiment, in a wireless communication disabled state, the control part 11 of the emergency notification device 10 transmits, in order to cause the mobile terminal 40 portable by the driver or the audio control device 30 mounted on the vehicle 1 and capable of wireless communication to execute transmission of the emergency information b to the emergency contact destinations, the emergency information transmission command signal c to the communication terminal via the near-field communication part 17 or the I/O part 12. Thereby, in the present embodiment, even if the emergency notification device 10 itself cannot communicate the emergency information b because of a wireless communication disabled state, the emergency information b can be communicated to the outside from the mobile terminal 40 carried by the driver or the audio control device 30 mounted on the vehicle 1. Therefore, it is possible to significantly improve the possibility of execution of emergency notification in case of vehicle emergency.

Further, in the present embodiment, it is possible to store device information identifying one or more mobile terminals 40 as registered communication terminals in the storage part 16 of the emergency notification device 10. The control part 11 acquires the device information about the mobile terminal 40 existing in the vehicle 1 via the near-field communication part 17 and judges whether the mobile terminal 40 that the control part 11 has communicated with is a registered communication terminal or not based on the device information stored in the storage part 16. Then, if the communication terminal that the control part 11 has communicated with (for example, the mobile terminal 40) is a registered communication terminal, the control part 11 can cause the emergency information b to be transmitted from this communication terminal. Thereby, in the present embodiment, when the emergency notification device 10 is in a state of communicating with a registered communication terminal registered in the storage part 16 via the near-field communication part 17 or the I/O part 12, it is possible to transmit the emergency information b to the outside via the registered communication terminal (the mobile terminal 40 or the audio control device 30).

Further, in the present embodiment, the storage part 16 of the emergency notification device 10 stores the communication addresses of the emergency contact destinations. Thereby, in the present embodiment, by the driver registering desired emergency contact destinations (for example, the mobile terminals 40*a*, 40*b* and 40*c*) in the storage part 16, it is possible to efficiently respond to a vehicle emergency state in case of vehicle emergency.

Further, in the present embodiment, in a wireless communication disabled state, the control part 11 of the emergency notification device 10 judges whether or not the control part 11 is in a state of communicating with a registered communication terminal via the near-field communication part 17 or the I/O part 12 and, if a registered communication terminal being in the communication state exists, can cause the emergency information b to be transmitted from the registered communication terminal. Thereby, in the present embodiment, if a registered communication terminal (for example, the mobile terminal 40 or the audio control device 30) being in the communication state exists in a wireless communication disabled state, it becomes possible to cause emergency information to be immediately transmitted from the registered communication terminal.

Further, in the present embodiment, in a wireless communication disabled state, the control part 11 of the emergency notification device 10 judges whether or not the control part 11 is in a state of communicating with a registered communication terminal via the near-field communication part 17 and, if a registered communication terminal being in the communication state does not exist, can establish a vehicle communication link with a registered communication terminal via the near-field communication part 17 and cause the emergency information b to be transmitted from the registered communication terminal. Thereby, in the present embodiment, even if a registered communication terminal being in a communication state via the near-field communication part 17 does not exist in a wireless communication disabled state, it is possible to, by newly establishing a vehicle communication link with a registered communication terminal (for example, the mobile terminal 40) cause the emergency information b to be transmitted from the registered communication terminal.

EXPLANATION OF REFERENCE NUMERALS

1 . . . vehicle
2 . . . emergency notification center
3 . . . base station
4 . . . communication network
5 . . . GPS satellite
10 . . . emergency notification device
20 . . . communication device
30 . . . audio control device
40 . . . mobile terminal
40*a*, 40*b*, 40*c* . . . mobile terminal
50 . . . vehicle battery
a1, a2 . . . vehicle emergency signal
b . . . emergency information
c . . . emergency information transmission command signal
d . . . vehicle communication link establishment requesting signal

The invention claimed is:

1. An emergency notification device for notifying an emergency notification center outside a vehicle of emergency information from the vehicle in case of a vehicle emergency, the emergency notification device comprising:
   a wireless communication part for performing wireless communication with the emergency notification center;
   a control part controlling the wireless communication part to perform the wireless communication with the emergency notification center in case of the vehicle emergency;
   an in-vehicle communication part for performing communication with at least one of a plurality of communication terminals in the vehicle; and
   a storage part storing device information identifying at least two of the plurality of communication terminals as registered communication terminals, wherein at least one of the registered communication terminals is portable by a driver of the vehicle;
wherein
   the control part is configured to, in a wireless communication disabled state in which the wireless communication with the emergency notification center via the wireless communication part is disabled in case of the vehicle emergency, communicate with the at least one of the registered communication terminals existing in the vehicle via the in-vehicle communication part to cause the at least one of the registered communication terminals existing in the vehicle to transmit the emergency information to at least another of the registered communication terminals other than the at least one of the registered communication terminals existing in the vehicle.

2. The emergency notification device according to claim 1, wherein the at least one of the registered communication terminals existing in the vehicle is an in-vehicle communication terminal, and
   wherein the control part is configured to:
   acquire device information about the in-vehicle communication terminal via the in-vehicle communication part;
   judge whether or not the in-vehicle communication terminal that the control part has communicated with is any one of the registered communication terminals, based on the device information stored in the storage part; and
   cause the in-vehicle communication terminal to transmit the emergency information, if the in-vehicle communication terminal that the control part has communicated with is the any one of the registered communication terminals.

3. The emergency notification device according to claim 2, wherein the storage part stores a communication address of the registered communication terminals.

4. The emergency notification device according to claim 3, wherein, in the wireless communication disabled state, the control part is configured to:

judge whether or not the control part is in a state of communicating with the any one of the registered communication terminals via the in-vehicle communication part; and cause the registered communication terminal to transmit the emergency information, if the any one of the registered communication terminals is in the communication state.

5. The emergency notification device according to claim 3, wherein, in the wireless communication disabled state, the control part is configured to:

judge whether or not the control part is in a state of communicating with the any one of the registered communication terminals via the in-vehicle communication part; and if none of the registered communication terminals is in the communication state, establish a vehicle communication link with any other of the registered communication terminals via the in-vehicle communication part and cause the any other of the registered communication terminals to transmit the emergency information.

6. An emergency notification system comprising:

an emergency notification device for notifying an emergency notification center outside a vehicle of emergency information from the vehicle in case of a vehicle emergency; and a plurality of communication terminals; wherein the emergency notification device comprises:

a wireless communication part for performing wireless communication with the emergency notification center;

a control part controlling the wireless communication part to perform the wireless communication with the emergency notification center in case of the vehicle emergency;

an in-vehicle communication part for performing communication with at least one of the plurality of communication terminals; and a storage part storing device information identifying at least two of the plurality of communication terminals as registered communication terminals, wherein at least one of the registered communication terminals is portable by a driver of the vehicle;

wherein the control part is configured to, in a wireless communication disabled state in which the wireless communication with the emergency notification center via the wireless communication part is disabled in case of the vehicle emergency, transmit an emergency information transmission command signal to the at least one of the registered communication terminals existing in the vehicle via the in-vehicle communication part in order to cause the at least one of the registered communication terminals existing in the vehicle to execute transmission of the emergency information to at least another of the registered communication terminals; and the at least one of the registered communication terminals existing in the vehicle is configured to transmit the emergency information to the at least another of the registered communication terminals other than the at least one of the registered communication terminals existing in the vehicle in response to receiving the emergency information transmission command signal.

7. The emergency notification device according to claim 4, wherein, in the wireless communication disabled state, the control part is configured to:

judge whether or not the control part is in the state of communicating with the any one of the registered communication terminals via the in-vehicle communication part; and if none of the registered communication terminals is in the communication state, establish a vehicle communication link with any other of the registered communication terminals via the in-vehicle communication part and cause the any other of the registered communication terminals to transmit the emergency information.

* * * * *